United States Patent
Suzuki

(10) Patent No.: US 7,021,351 B2
(45) Date of Patent: Apr. 4, 2006

(54) BEAD CORE OF PNEUMATIC TIRE

(75) Inventor: Kazuya Suzuki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/082,867

(22) Filed: Mar. 18, 2005

(65) Prior Publication Data

US 2005/0252594 A1    Nov. 17, 2005

(30) Foreign Application Priority Data

May 14, 2004 (JP) ............................. 2004-145301

(51) Int. Cl.
*B60C 15/04* (2006.01)
*D07B 1/18* (2006.01)

(52) U.S. Cl. ........................................ 152/540; 245/1.5

(58) Field of Classification Search ................ 152/540; 156/136, 422; 245/1.5; 140/88
See application file for complete search history.

(56) References Cited

U.S. PATENT DOCUMENTS

| 903,714 | A | * | 11/1908 | Hawley et al. | .......... 245/1.5 X |
| 1,665,853 | A | * | 4/1928 | Leguillon | ................... 156/422 |
| 4,938,437 | A | * | 7/1990 | Rausch | ................... 152/540 X |
| 2001/0005975 | A1 | * | 7/2001 | Golightly | |

FOREIGN PATENT DOCUMENTS

| FR | 1.251.403 | * 12/1960 | ................. 152/540 |
| JP | 9-315112 A | 12/1997 | |

* cited by examiner

*Primary Examiner*—Adrienne C. Johnstone
(74) *Attorney, Agent, or Firm*—Birch, Stewart, Kolasch & Birch, LLP

(57) ABSTRACT

A bead core for pneumatic tires comprised of a ring-like bead core main body 11 in which a single bead wire 10 is wound in a multi-seriate and multi-staged manner and provided with angular portions P on an outer peripheral surface S in a meridian section thereof, and staple fittings 12 in which a meridian section is warped in a C-shaped manner for preventing loosening of the bead wire 10 by surrounding the outer peripheral surface S. The staple fittings 12 comprise concave portions 14 for restricting positional shift of the staple fittings around the bead core main body 11 with the angular portions P entering the same. With this arrangement, it is possible to restrict positional shift of the staple fittings around the bead core and to effectively restrict damages of inner liner rubber owing to the positional shift.

10 Claims, 6 Drawing Sheets (Rolling process)
(Adhering process)
(Cutting process)
(Bending process)

BEAD CORE OF PNEUMATIC TIRE

BACKGROUND OF THE INVENTION

1. Field of the Invention

The present invention relates to a bead core of pneumatic tires in which loosening of a bead wire is prevented by means of staple fittings.

2. Background of the Invention

Bead cores for pneumatic tires of so-called single wind structure are being heavily used in which a single bead wire is successively wound in a multi-seriate and multi-staged manner. In case of a bead core of such a structure, the bead core is generally solidified by wrapping the entire bead core by means of a wrapping sheet made of textile cloth or similar for preventing loosening of the wound and overlapped bead wire and for maintaining its shape at cross-sectional surface thereof. However, such wrapping using a wrapping sheet is inferior in terms of operating efficiency, and it may cause degradations in productivity or higher expenses.

It is thus being performed in these years that a C-shaped staple fitting (a) made of a metallic wire rod is employed as illustrated, for instance, in FIG. 8(A), for surrounding the periphery of the bead core (b) to be solidified at several spots including at least the start portion and the end portion of winding.

However, while such a staple fitting (a) is capable of preventing loosening, the clamping force to the bead core (b) is weak. Accordingly, the staple fitting (a) tends to be pulled by a carcass (c) to cause a positional shift in a rotating direction around the bead core as illustrated in FIG. 8(B) during shaping when forming a green tire. As a result, a tip end a1 of the staple fitting (a) will project through carcass cords into a tire cavity side so that a drawback of damaging an inner liner rubber is caused.

BRIEF SUMMARY OF THE INVENTION

Therefore, the present invention aims to provide a bead core for pneumatic tires capable of restricting positional shifts of staple fittings around bead cores and of effectively restricting damages of the inner liner rubber owing to those positional shifts.

The present invention is a bead core for pneumatic tires comprised of a ring-like bead core main body in which a single bead wire is wound in a multi-seriate and multi-staged manner, and staple fittings made of metallic material, wherein the bead core main body is arranged in that an outer peripheral surface of the bead core main body includes angular portions that project outward in a meridian section including a central axis thereof, wherein the staple fittings are arranged in that they are warped in a C-shaped manner for preventing loosening of the bead wire by surrounding the outer peripheral surface of the bead core main body, and wherein the staple fittings comprise concave portions for restricting positional shift of the staple fittings around the bead core main body with the angular portions entering the same.

The bead core in the present invention may include outwardly projecting angular portions in the meridian section including the central axis thereof with an outer peripheral surfaces of the bead core main body joining, and wherein at least a part of the inner peripheral surface of the staple fittings is deformed in a wave-like manner by forming the concave portions in a repetitive manner in a length direction of the staple fittings to correspond to at least some of the angular portions.

And the bead core in the invention may include n-number of angular portions of 1 to 8 in the bead main body, and the staple fitting includes m-number of concave portions of not more than (n).

Also, in the bead core in the present invention, a height (h) in an angular direction of the staple fitting with respect to an inner peripheral surface joining inner most end positions of the staple fitting is defined to be 0.3 to 1.5 mm.

And when the number (n) of angular portions of the bead core main body is 6 and the number (m) of concave portions of the staple fitting is 2 or 3, the height (h) may be defined as 0.5 to 1.3 mm, while when the number (m) of concave portions of the staple fitting is 4, the height (h) is defined as 0.5 to 0.8 mm.

DETAILED DESCRIPTION OF THE INVENTION

Figure 1:
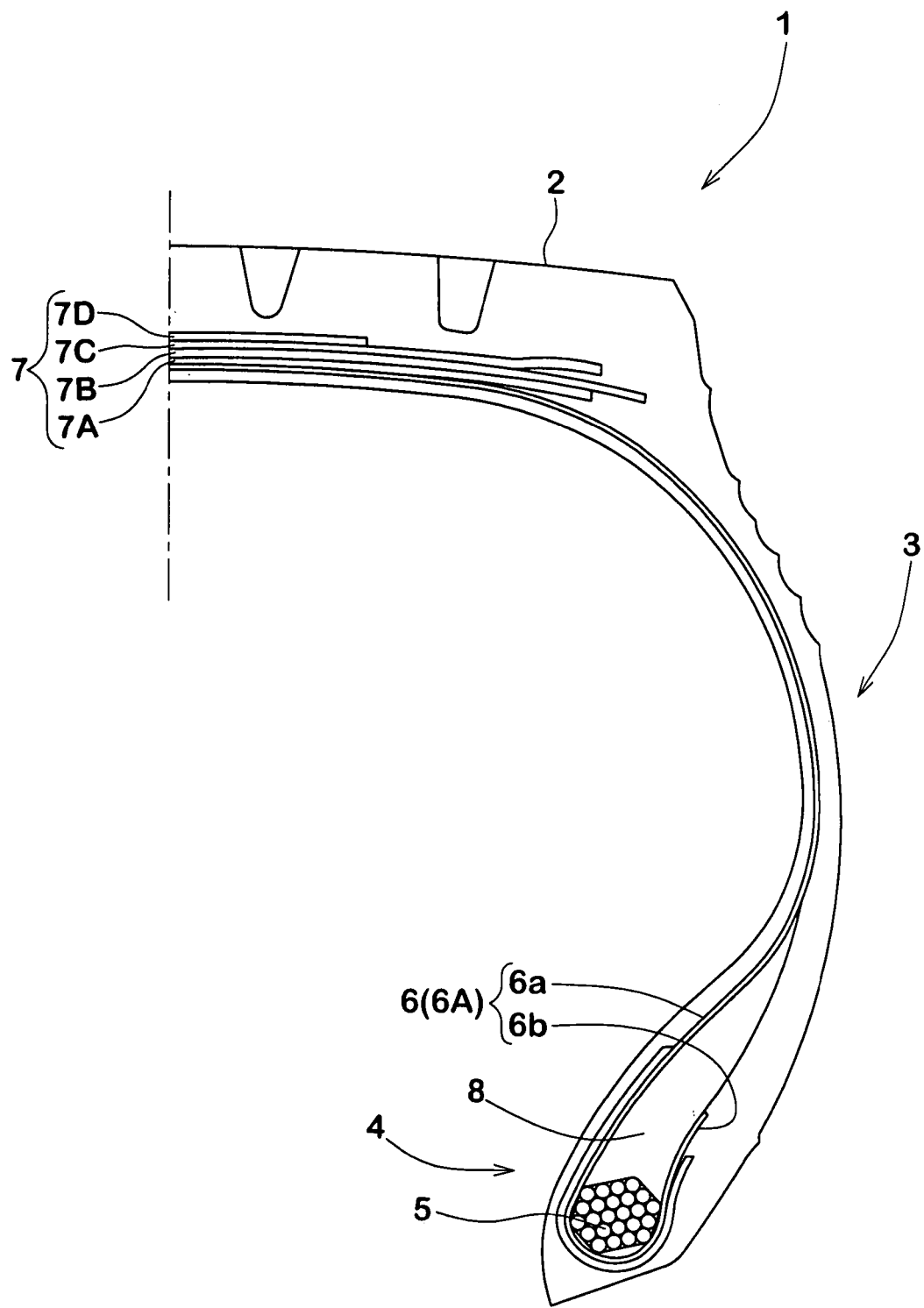
FIG. 1 is a sectional view illustrating one embodiment of a pneumatic tire employing the bead core of the present invention.

One embodiment of the present invention will now be explained in line with illustrated examples. FIG. 1 is a sectional view illustrating a case in which a pneumatic tire employing the bead core of the present invention is a heavy-duty tire, for example.

In FIG. 1, a pneumatic tire 1 comprises bead portions 4 at respective inner ends of sidewall portions 3 extending from both ends of a tread portion 2 inward in a tire radial direction to be fitted to a rim. Ring-like bead cores 5 are embedded into the bead portions 4 while a toroidal carcass 6 is bridged between the bead cores 5, 5.

The carcass 6 is comprised of one or more sheets of carcass plies (while the present embodiment employs a single carcass ply 6A) in which carcass cords are aligned at angles of, for instance, 75 to 90 degrees with respect to a tire peripheral direction. The carcass ply 6A comprises, in a serial manner, ply turnup portions 6b on both sides of a ply main body portion 6a that bridges over the bead cores 5, 5, which are being turned up from inside to outside around the bead cores 5 to be engaged thereat. In this respect, an apex rubber 8 for bead reinforcing purposes that extends from the bead cores 5 outside in the tire radial direction in a tapered manner is provided between the ply main body portion 6a and the ply turnup portions 6b.

A belt layer 7 is wound in a tire peripheral direction outside of the carcass 6 and inside of the tread portion 2. The belt layer 7 is comprised of two or more belt plies employing belt cords (wherein two sheets of plies are usually employed for tires for passenger cars while three or four sheets are employed for heavy-duty tires). The present embodiment illustrates a case in which the belt layer 7 is of four-sheet structure comprised of a first belt ply 7A on an innermost side in the radial direction in which steel cords are aligned at angles of, for instance, 45 to 75 degrees with respect to the tire peripheral direction, and second to fourth belt plies 7B to 7D in which cords are aligned at small angles of, for instance, 10 to 35 degrees with respect to the tire peripheral direction. The belt plies 7A to 7D serve to improve belt rigidity and to reinforce the tread portion 2 through hoop effects by providing one or more spots at which the belt cords mutually intersect between the plies to be superposed.

Figure 2:
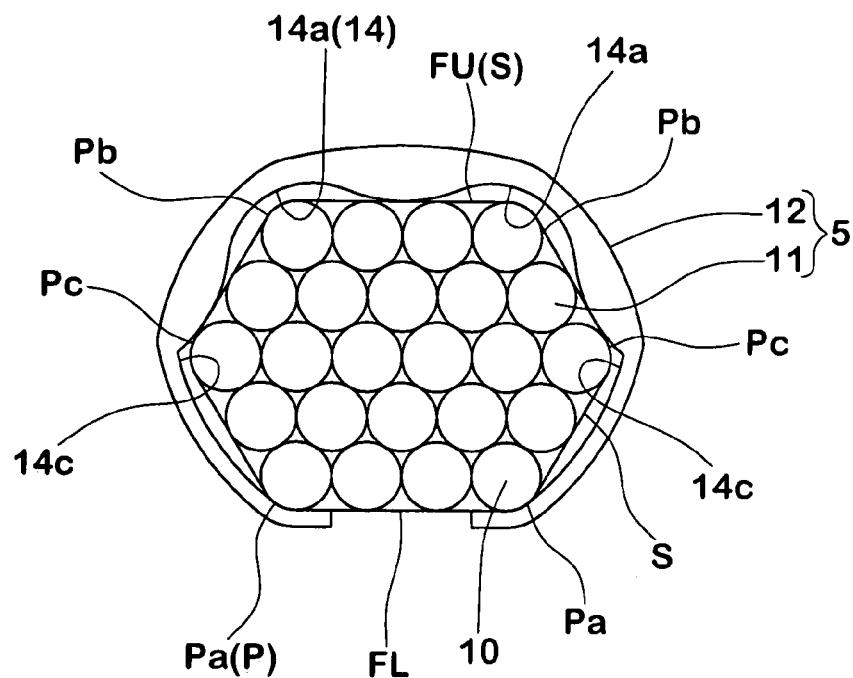
FIG. 2 is a sectional view illustrating the bead core in enlarged form.

As illustrated in FIG. 2 in enlarged form, each bead core 5 is comprised of a ring-like bead core main body 11 of so-called single wind structure in which a single bead wire 10 made, for instance, of steel wire, is successively wound in a multi-seriate and multi-staged manner, and a staple fitting 12 employing a metallic material.

Figure 4A:
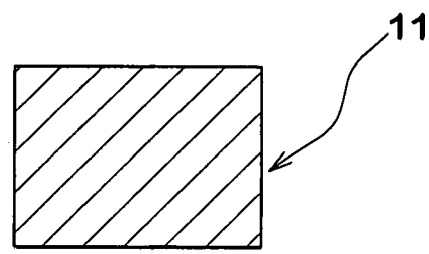
FIGS. 4(A) to 4(C) are sectional views illustrating another example of a bead core main body.
Figure 4B:
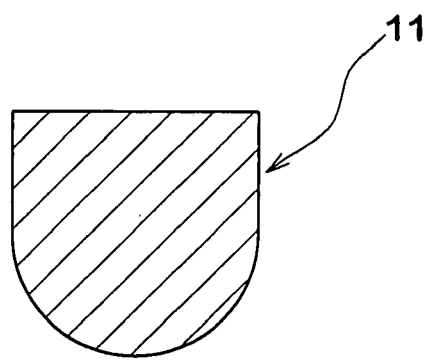
Figure 4C:
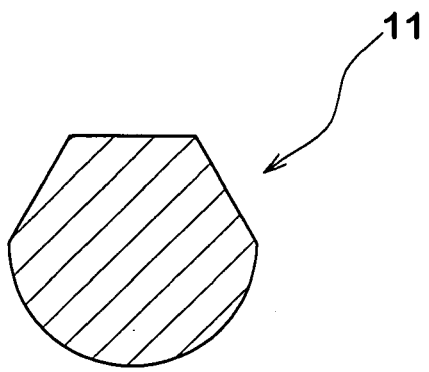

A ridge portion of the bead core main body 11 forms angular portions P that project outside, with an outer peripheral surface S joining in a polygonal sectional manner in a meridian section including its central axis. As illustrated in FIG. 2, the present embodiment illustrates a bead core in which the angular portions P assume joining portions in a polygonal sectional shape. In this respect, it may also be formed as a non-circular sectional shape including n-numbers (at least one or more) of angular portions P on the outer peripheral surface S. As the bead core main body 11 of polygonal shape, it is possible to favorably employ a polygonal shape which is less than octagonal ($n \leq 8$) such as a hexagonal shape ($n=6$) as in the present embodiment, a square shape ($n=4$) as illustrated in FIG. 4(A). In the case of $n>8$, the bead core main body 11 will become too close to a circular shape so that it will become difficult to sufficiently exhibit effects of restricting positional shifts of the staple fittings 12 employing the angular portions P. In this respect, it is also possible to employ, where necessary, a complex shape in which a part of the polygonal shape is replaced by a circular shape as illustrated in FIGS. 4 (B) and 4 (C) besides the polygonal shape.

A metallic material is used as the staple fitting 12. The metallic material may be a metallic wire such as steel wire, aluminum wire, or the like. The staple fitting 12 has a C-shaped form made of a metallic material (hereinafter explained as metallic wire rod). The staple fitting 12 prevents loosening of the bead wire 10 by surrounding the outer peripheral surface S of the bead core main body 11. Accordingly, the staple fitting 12 is mounted to surround the outer peripheral surface S of the meridian section including the central axis (in other words, a transverse section that is orthogonal to the tire peripheral direction).

Figure 3:
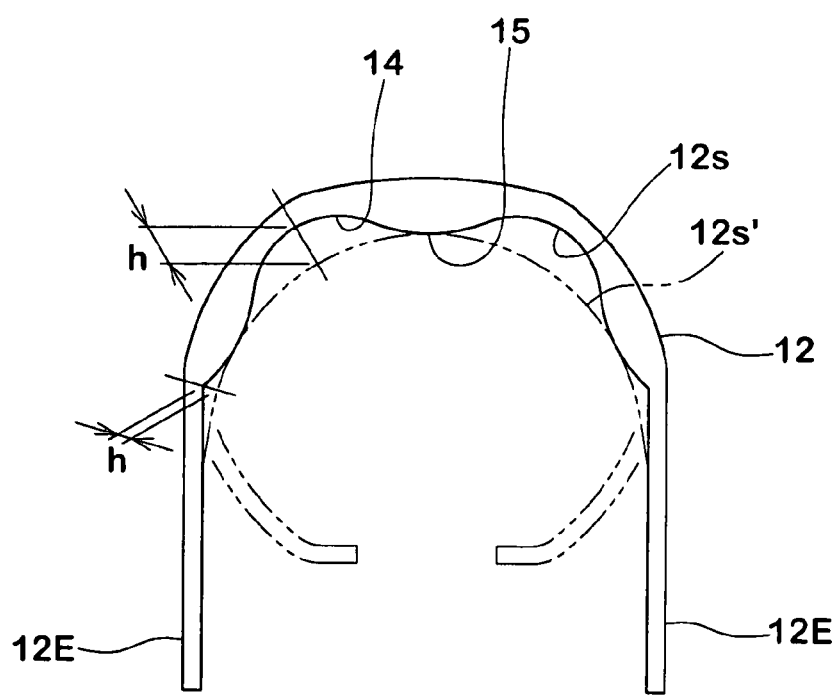
FIG. 3 is a front view for explaining a staple fitting before driving the same.

More particularly, the staple fitting 12 has a substantially gate-like shape in a condition prior to driving as illustrated in FIG. 3. It is driven from outside in a radial direction of the bead core main body 11 by using a known staple driving means. At this time, tip end portions 12E of the gate-like shape are bent inward and are shaped in a C-shaped manner so that the bead wire 10 can be easily solidified. In this respect, the staple fittings 12 are disposed at positions including at least a start portion and an end portion of winding of the bead wire 10.

In the present embodiment, the staple fitting 12 is formed at an inner peripheral surface 12s thereof, with concave portions 14 (as illustrated in FIGS. 2 and 3) for restricting positional shifts around the bead core main body 11, with the angular portions P entering the same.

In the present embodiment, the bead core main body 11 assumes a hexagonal section that is horizontally long and flat, and its inner surface FL in the radial direction is disposed to face a bead bottom surface side. In this illustrated case, the bead core main body 11 has a total of six ($n=6$) angular portions P comprised of inner angular portions Pa, Pa on both sides of the inner surface FL in the radial direction, outer angular portions Pb, Pb on both sides of an outer surface FU in the radial direction, and intermediate angular portions Pc, Pc that mostly project outward in a width direction are disposed on the outer peripheral surface S.

M-number of concave portions 14 less than n-numbers (numbers of angular portion P) are formed on the inner peripheral surface 12s of the staple fitting 12. In the present embodiment, a total of four ($m=4 \leq n$) concave portions 14 comprised of concave portions 14a, 14a into which the outer angular portions Pb, Pb enter, and concave portions 14c, 14c into which the intermediate angular portions Pc, Pc enter are formed. The four concave portions 14 correspond to the positions of the angular portions P and repeat themselves in a length direction of the staple fitting 12. With this arrangement, at least a part of the inner peripheral surface 12s is deformed in a wave-like shape in which the concave portions 14 and convex portions 15 intermediate thereof alternately repeat themselves. Moreover, the staple fitting 12 is arranged in that positional shifts of the staple fittings 12 around the bead core main body 11 are restricted by the angular portions P entering the concave portions 14.

Here, where positions of forming the concave portions 14 do not suit the positions of the angular portions P, effects of restricting positional shift of the staple fitting 12 will not be effectively exhibited. Further, it may happen that the number of concave portions 14 is too large so that convex portions 15 are formed at the tip end portions 12E. In such an instance, bending the tip end portions 12E will become difficult when performing driving, and it may cause failure in solidifying the bead core main body 11. Accordingly, the number (m) of forming the concave portions 14 is preferably such that a lower limit thereof is defined as two or more, and an upper limit number (m) thereof is preferably defined as not more than n at maximum, and preferably not more than n−2 or even not more than n−3.

For achieving the effects of restricting positional shift, it is also preferable to set a height (h) of the concave portions 14 to be in a range of 0.3 to 1.5 mm. When the height (h) is less than 0.3 mm, engagement with the angular portions P will become insufficient, and when it exceeds 1.5 mm, movements of the angular portions P within the concave portions 14 will become excess, and in both cases, effects of restricting positional shift tend to be degraded. In view of this point, a lower limit for the height (h) is preferably set to not less than 0.4 mm, and further not less than 0.5 mm, and an upper limit thereof is preferably set to not more than 1.3 mm, and further not more than 1.0 mm. In this respect, the height (h) of each concave portions 14 denotes a maximum height in a direction orthogonal of the inner peripheral surface 12s of the staple fitting 12 with respect to a virtual inner peripheral surface 12s' that joins innermost end positions.

Figure 7:
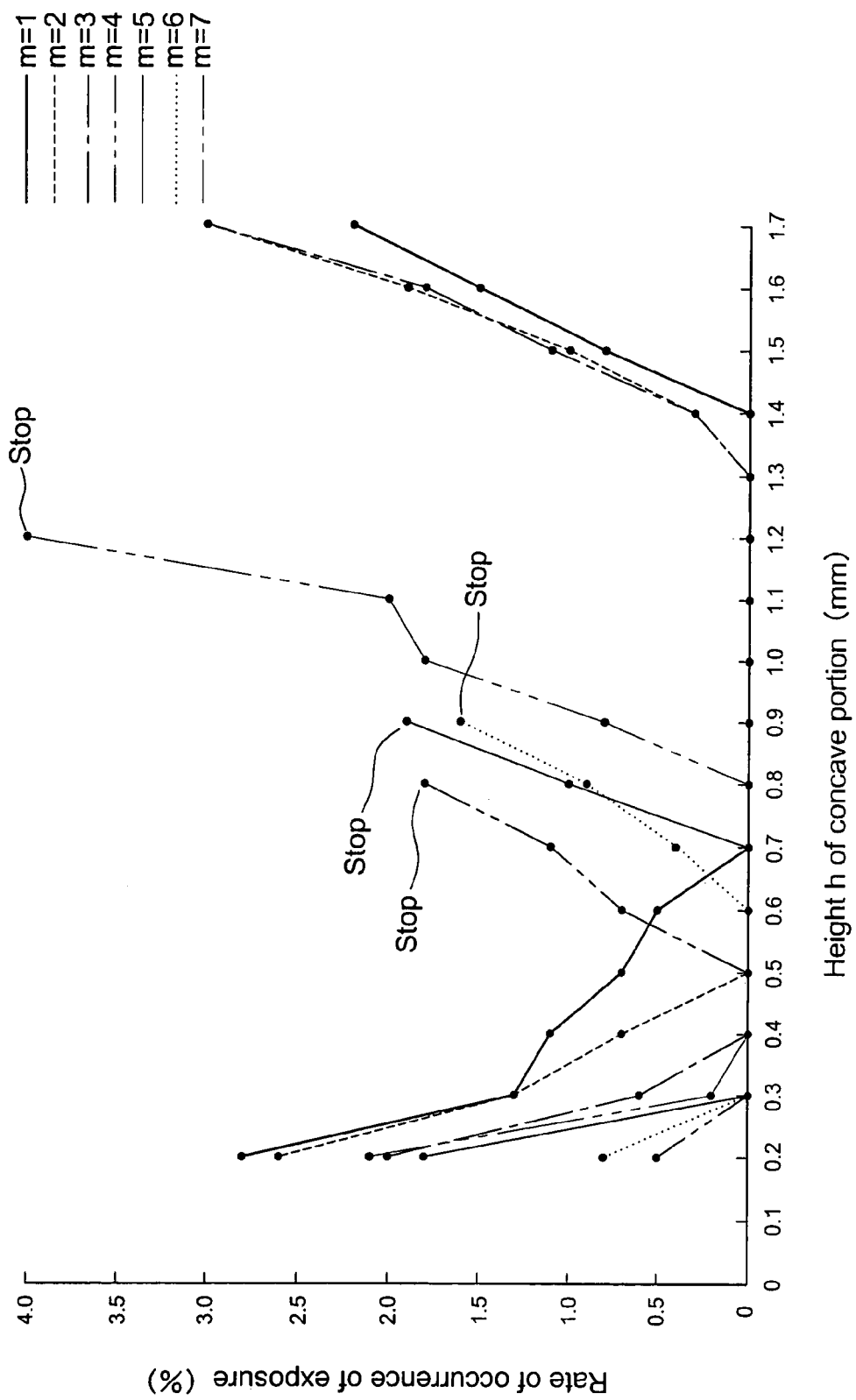
FIG. 7 is a diagram illustrating test results of the embodiment.
Figure 8A:
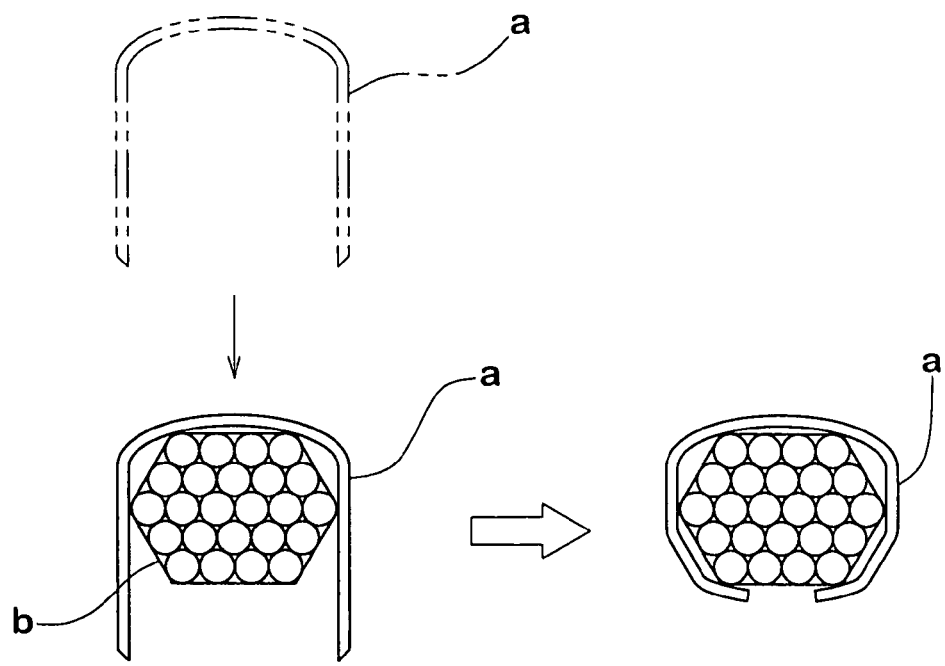
FIGS. 8(A) and 8(B) are diagrams for explaining problems of the prior art.
Figure 8B:
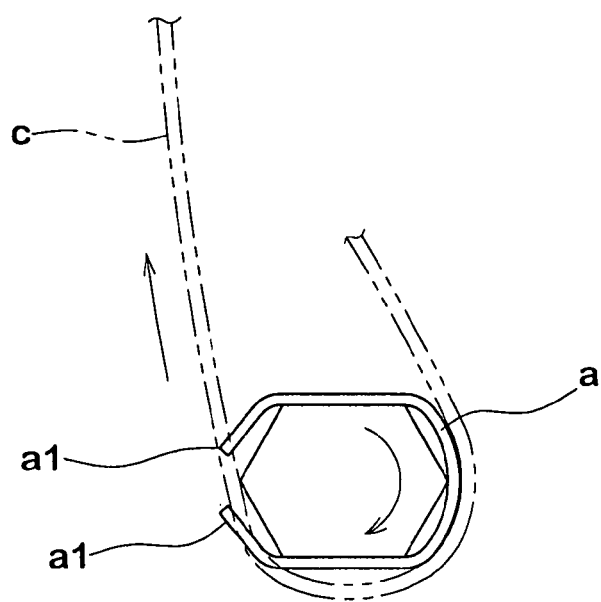

In this respect, it can be seen from FIG. 7 which illustrates results of measurement of the embodiment as will be described later that when the number (n) of angular portions of the bead core main body is 6, the rate of occurrence of exposure can be made to 0% where the number (m) of concave portions of the staple fitting is 2 or 3 by setting the height (h) to be in a range of 0.5 to 1.3 mm. Further, the rate of occurrence of exposure can be made to 0% where the number (m) of concave portions of the staple fitting is 4 when the height (h) is set to 0.4 to 0.8 mm.

Figure 5:
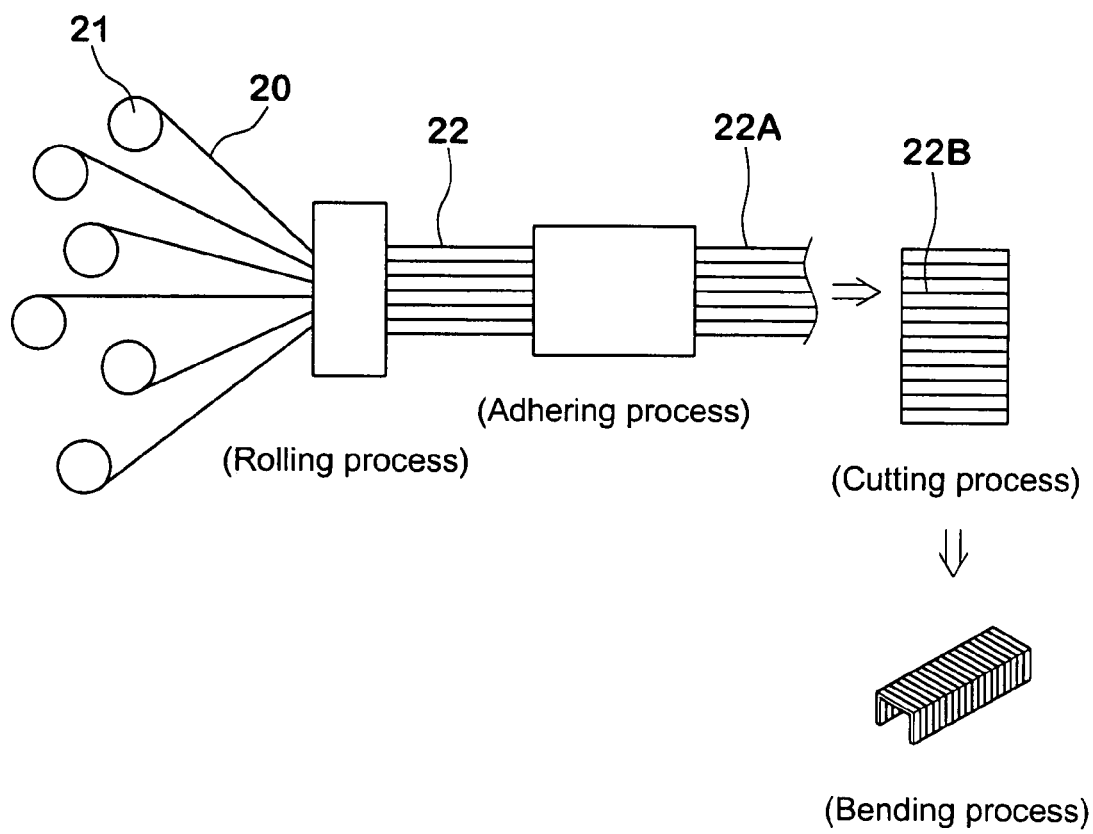
FIG. 5 is a diagram for explaining a method for forming the staple fitting.

Here, a conventional staple fitting is usually formed, as illustrated in FIG. 5, upon using (1) a rolling process of drawing out a metallic wire rod 20 in a bundled manner from a bobbin 21 onto which the metallic wire rod 20 is wound and rolling the same for forming a group of stripe-like wire rods 22 in which each metallic wire rod 20 is aligned in a parallel manner;

(2) an adhering process of applying adhesive to the group of wire rods 22 and fixing the metallic wire rods 20 together;

(3) a cutting process of cutting the adhered group of wire rods 22A into a length corresponding to a peripheral length of the outer peripheral surface S; and (4) a bending process of bending the cut group of wire rods 22B to form a gate-like shape.

The staple fittings 12 of the present invention can further form the concave portions 14 upon performing press molding of the group of wire rods 22B during, for instance, the bending process.

Figure 6:
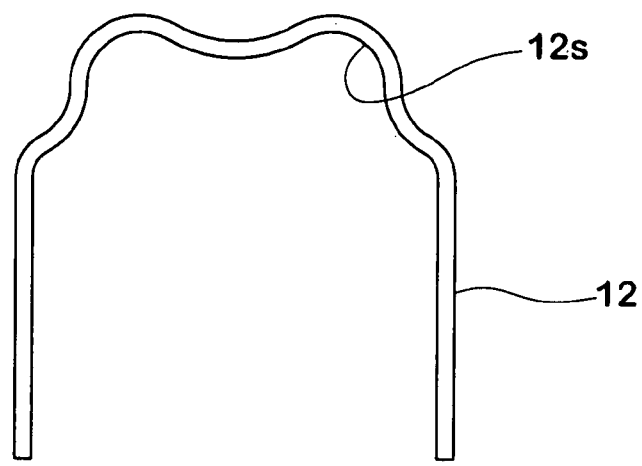
FIG. 6 is a diagram illustrating another example of the staple fitting.

In this respect, for instance, as illustrated in FIG. 6, the staple fittings 12 of the present invention can be formed to have substantially identical thicknesses in the length direction by employing a wave-like outer peripheral surface similar to the inner peripheral surface 12s.

While a particularly preferred embodiment of the present invention has been explained in details so far, the present invention is not limited to the illustrated embodiment alone but can be embodied upon modifying the same into various forms.

EXAMPLE

Staple fittings 12 which number (m) of forming the concave portions 14 and the height (h) have been variously changed are formed for a bead core main body 11 having a hexagonal section that is horizontally long and flat (FIG. 3). A bead core 5 which bead wire 10 has been solidified by the staple fittings 12 was employed for forming 1,000 green tires through ordinary methods. The presence or absence of exposure of the tip ends of the staple fittings 12 to the tire cavity accompanying rotational shifts of the staple fittings 12 was examined. Results of rates of occurrence (%) of exposures are illustrated in FIG. 7.

As described above, where the number m of concave portions of the staple fittings is 2 or 3, the rate of occurrence of exposure can be made to 0% when the height (h) is in the range of 0.5 to 1.3 mm. Further, the rate of occurrence of exposure can be made to 0% where the number m of concave portions of the staple fitting is 4 when the height (h) is set to 0.4 to 0.8 mm. In this respect, according to the results of FIG. 7, when m is 5, h is in the range of 0.3 to 0.7 mm while when m is 6, h is in the range of 0.3 to 0.6 mm. As illustrated in FIG. 7, it can be confirmed that rotational shift of the staple fittings 12 can be restricted by providing the concave portions 14 into which the angular portions (P) enter onto the inner peripheral surface 12s of the staple fittings 12. In this respect, "stop" in FIG. 7 means that no measurement could be performed for heights (h) exceeding the indicated values.

What is claimed is:

1. A bead core for pneumatic tires comprised of a ring-like bead core main body in which a single bead wire is wound in a multi-seriate and multi-staged manner, and staple fittings made of metallic material, wherein the bead core main body is arranged in that an outer peripheral surface of the bead core main body includes angular portions that project outward in a meridian section including a central axis thereof, wherein the staple fittings are arranged in that they are warped in a C-shaped manner for preventing loosening of the bead wire by surrounding the outer peripheral surface of the bead core main body, wherein the staple fittings comprise concave portions at an inner peripheral surface thereof for restricting positional shift of the staple fittings around the bead core main body with the angular portions entering the concave portions, and wherein at least a part of the inner peripheral surface of the staple fittings is deformed in a wave-like manner by forming the concave portions in a repetitive manner in a length direction of the staple fittings to correspond to at least some of the angular portions.

2. The bead core for pneumatic tires as claimed in claim 1, wherein the bead core main body assumes a polygonal section including the outwardly projecting angular portions in the meridian section including the central axis thereof with outer peripheral surfaces of the bead core main body joining.

3. The bead core for pneumatic tires as claimed in claim 1 or 2, wherein the bead core main body includes n-number of angular portions of 1 to 8, and the staple fitting includes m-number of concave portions of not more than n.

4. The bead core for pneumatic tires as claimed in claim 2, wherein the metallic material is a metallic wire rod.

5. The bead core for pneumatic tires as claimed in claim 3, wherein the metallic material is a metallic wire rod.

6. The bead core for pneumatic tires as claimed in claim 1, wherein the concave portions are arranged in that a height (h) in an angular direction of the staple fitting with respect to a virtual inner peripheral surface joining inner most end positions of the staple fitting is defined to be 0.3 to 1.5 mm.

7. The bead core for pneumatic tires as claimed in claim 6, wherein the metallic material is a metallic wire rod.

8. The bead core for pneumatic tires as claimed in claim 6, wherein when the number (n) of angular portions of the bead core main body is 6 and the number (m) of concave portions of the staple fitting is 2 or 3, the height (h) is defined as 0.5 to 1.3 mm, while when the number (m) of concave portions of the staple fitting is 4, the height (h) is defined as 0.5 to 0.8 mm.

9. The bead core for pneumatic tires as claimed in claim 8, wherein the metallic material is a metallic wire rod.

10. The bead core for pneumatic tires as claimed in claim 1, wherein the metallic material is a metallic wire rod.

* * * * *